United States Patent [19]

Mineshima et al.

[11] Patent Number: 4,692,501
[45] Date of Patent: Sep. 8, 1987

[54] PROCESS FOR CONTINUOUS MULTI-STAGE POLYMERIZATION OF OLEFINS

[75] Inventors: Hideo Mineshima; Haruyuki Koda, both of Ohtake; Ryoichi Yamamoto, Yamaguchi, all of Japan

[73] Assignee: Mitsui Petrochemical Industries, Ltd., Tokyo, Japan

[21] Appl. No.: 761,330

[22] Filed: Jul. 31, 1985

Related U.S. Application Data

[63] Continuation of Ser. No. 556,899, Dec. 1, 1983, abandoned.

[30] Foreign Application Priority Data

Feb. 6, 1982 [JP] Japan .................................. 57-92999

[51] Int. Cl.$^4$ ............................ C08F 2/14; C08F 6/24
[52] U.S. Cl. ..................................... 526/65; 526/351; 526/352; 526/901; 525/53; 528/498; 422/134
[58] Field of Search ................. 526/65, 901, 351, 352; 528/498; 422/132, 134; 525/53

[56] References Cited

U.S. PATENT DOCUMENTS

| | | | |
|---|---|---|---|
| 3,347,955 | 10/1967 | Renaudo | 422/134 |
| 4,053,697 | 10/1977 | Asada et al. | 528/498 X |
| 4,187,278 | 2/1980 | Clifford | 526/65 X |
| 4,368,291 | 1/1983 | Frese et al. | 525/53 |
| 4,492,787 | 1/1985 | Takashima et al. | 422/134 X |

FOREIGN PATENT DOCUMENTS

0040992A1 12/1981 European Pat. Off. .............. 526/65

*Primary Examiner*—Joseph L. Schofer
*Assistant Examiner*—F. M. Teskin
*Attorney, Agent, or Firm*—Sherman and Shalloway

[57] ABSTRACT

In a process for producing an olefin polymer which comprises continuously polymerizing an olefin in the presence of a catalyst composed of a transition metal compound component and an organometallic compound component in at least two independent polymerization zones connected in series by a pipeline while feeding the olefin and the catalyst into an upstream zone of polymerization and withdrawing the resulting polymer from a downstream zone of polymerization; the improvement wherein
(1) the polymerization in the upstream polymerization zone is carried out in a liquid medium under conditions for slurry polymerization,
(2) the solid polymer-containing slurry discharged from the upstream polymerization zone is fed into a liquid medium exchanging zone through an upper feed opening (A) in its upper portion, said liquid medium exchanging zone being provided between the upstream polymerization zone and the downstream polymerization zone and connected to these zones by pipelines, and an additional supply of the liquid medium is fed into said exchanging zone through a lower feed opening (B) in the lower portion of said exchanging zone,
(3) the discharge flow from an upper discharge opening (C) in the exchanging zone above the upper feed opening (A) is recycled to the upstream polymerization zone, and the discharge flow from a bottom discharge opening (D) in the exchanging zone below the lower feed opening (B) is fed into the downstream polymerization zone, and
(4) the amount of the liquid medium in the discharge stream from the bottom discharge opening (D) is adjusted to 1 to 8 times the volume of the additional liquid medium fed from the lower feed opening (B), and thus the precipitated solid polymer is discharged from the bottom discharge opening (D) while it is concurrent with, and in contact with, the liquid medium from the lower feed opening (B).

9 Claims, 1 Drawing Figure

PROCESS FOR CONTINUOUS MULTI-STAGE POLYMERIZATION OF OLEFINS

This application is a continuation, of application Ser. No. 556,899, filed Dec. 1, 1983, now abandoned.

BACKGROUND OF THE INVENTION

This invention relates to an improvement in a process for producing an olefin polymer which comprises continuously polymerizing an olefin in the presence of a catalyst composed of a transition metal compound component and an organo-metallic compound component in at least two independent polymerization zones connected in series by a pipeline while feeding the olefin and the catalyst into an upstream zone of polymerization and withdrawing the resulting polymer from a downstream zone of polymerization.

In the present application, the term "polymerization" is used to denote both homopolymerization and copolymerization, and the term "polymer", to denote both a homopolymer and a copolymer.

More specifically, the present invention relates, in the aforesaid process, to the improvement wherein (1) the polymerization in the upstream polymerization zone is carried out in a liquid medium under conditions for slurry polymerization, (2) the solid polymer-containing slurry discharged from the upstream polymerization zone is fed into a liquid medium exchanging zone through an upper feed opening (A) in its upper portion, said liquid medium exchanging zone being provided between the upstream polymerization zone and the downstream polymerization zone and connected to these zones by pipelines, and an additional supply of the liquid medium is fed into said exchanging zone through a lower feed opening (B) in the lower portion of said exchanging zone, (3) the discharge flow from an upper discharge opening (C) in the exchanging zone above the upper feed opening (A) is recycled to the upstream polymerization zone, and the discharge flow from a bottom discharge opening (D) in the exchanging zone below the lower feed opening (B) is fed into the downstream polymerization zone, and (4) the amount of the liquid medium in the discharge flow from the bottom discharge opening (D) is adjusted to 1 to 8 times the volume of the additional liquid medium fed from the lower feed opening (B), and thus the precipitated solid polymer is discharged from the bottom discharge opening (D) while it is concurrent with, and in contact with, the liquid medium from the lower feed opening (B).

The process for producing an olefin polymer is generally known which comprises continuously polymerizing an olefin in the presence of a catalyst in at least two independent polymerization zones connected in series by a pipeline while feeding the olefin and the catalyst into an upstream zone of polymerization and withdrawing the resulting polymer from a downstream zone of polymerization.

When the polymerization in the upstream polymerization zone is carried out in a liquid medium under slurry polymerization conditions in performing such a process for continuous multi-stage polymerization of olefins, it is the usual practice to feed the solid polymer-containing slurry discharged from the upstream polymerization zone, either as such or after concentrating it, to the downstream polymerization zone and to continue the polymerization in the downstream zone. In the practice of this process, the unreacted olefin, a molecular weight controlling agent such as hydrogen, catalyst ingredients such as organoaluminum compounds or electron donors, etc. which the solid polymer-containing slurry from the upstream polymerization zone may contain are entrained in a feed flow to the downstream polymerization zone and affect the polymerization in the downstream polymerization zone. Frequently, therefore, it is difficult to prescribe the desired polymerization conditions in the downstream polymerization zone. Furthermore, in actual operations, the residence times of the individual catalyst particles in the polymerization zone are difficult to control to a nearly constant value, and are substantially different. This means that there is a distribution in the residence times of the catalyst particles. Such a difference tends to result in degrading or varying the quality of the resulting polyolefin.

The present inventors made extensive investigations in order to develop an improved process which can overcome the aforesaid technical problems of the continuous multi-stage polymerization of olefins. These investigations have led to the discovery that the aforesaid technical problems can be overcome by performing the continuous multi-stage polymerization of olefins under the conditions satisfying a combination of the parameters (1), (2), (3) and (4) described above; that the desired polymerization conditions in the downstream polymerization zone can be prescribed easily by using a simple additional means and an easy operation; and that an olefin polymer having an excellent and uniform quality can be produced with industrial advantage while circumventing the undesirable effects of the polymerization conditions of the upstream polymerization zone. It has also been found that an olefin polymer having the desired molecular weight distribution and/or composition distribution can be produced with good quality reproducibility without any undesirable variation in these distributions.

Investigations of the present inventors have shown that the aforesaid excellent improvement can be achieved when under the conditions (1) and (3) described above, the liquid medium exchange zone meeting the condition (2) is provided, and the amount of the liquid medium in the discharge flow from the exchanging zone and the amount of the additional liquid medium fed to the exchanging zone are specified in accordance with the condition (4), thereby discharging the precipitated solid polymer while it is concurrent with, and in contact with, the additional liquid medium from the exchanging zone.

Japanese Patent Publication No. 31227/1977 (published on Aug. 13, 1977) proposes a technique of removing the defect that in performing one-stage slurry polymerization of propylene using propylene in the liquid state as a liquid medium, the resulting polymer contains large amounts of a boiling heptane-soluble polymer and catalyst residues. This patent document discloses a process for producing a polymer or copolymer of propylene, which comprises polymerizing propylene or copolymerizing propylene with another unsaturated hydrocarbon monomer in liquid propylene as a liquid medium, contacting the polymer slurry withdrawn from a zone of said reaction countercurrently with liquid propylene as an additional liquid medium in a separately provided washing tower, separating and removing from the polymer slurry the propylene polymer or copolymer dissolved in the slurry and the unreacted unsaturated hydrocarbon monomer (mainly the liquid propylene) containing the catalyst having residual activity, and re-using a part or the whole of the unreacted unsaturated hydrocarbon monomer as a starting liquid for the polymerization step. This patent document only refers to one-stage slurry polymerization, and gives no description about multi-stage polymerization. Naturally, therefore, it is silent on the aforesaid troubles in the multi-stage polymerization. Particularly, it does not state that the prescription of the desired polymerization conditions in the downstream polymerization zone is adversely affected by the polymerization conditions in the upstream polymerization zone, much less any information about means for eliminating such a trouble. In other words, this patent document fails to give any disclosure about the combination of the parameters (1) to (4) in accordance with the present invention and any information serving to lead to these parameters. On the contrary, it only discloses conditions inconsistent with the aforesaid combination of the parameters (1) to (4). For example, this patent document teaches that it is essential to contact the liquid propylene as an additional liquid medium fed from the bottom of the washing tower countercurrently with the polymer slurry withdrawn from the polymerization zone and to feed it into the upper portion of the washing tower.

SUMMARY OF INVENTION

Investigations of the present inventors have shown that the aforesaid technical problems of the continuous multi-stage polymerization of olefins can be advantageously overcome by the continuous multi-stage polymerization of olefins under conditions which meet the combination of the parameters (1), (2), (3) and (4), and thus, there can be provided a markedly improved process for continuously polymerizing olefins in a multiplicity of stages.

It is an object of this invention therefore to provide an improved process for polymerizing olefins continuously in a multiplicity of stages.

The above and other objects and advantages of this invention will become more apparent from the following description.

According to this invention, there is provided, in a process for producing an olefin polymer which comprises continuously polymerizing an olefin in the presence of a catalyst composed of a transition metal compound component and an organometallic compound component in at least two independent polymerization zones connected in series by a pipeline while feeding the olefin and the catalyst into an upstream zone of polymerization and withdrawing the resulting polymer from a downstream zone of polymerization, the improvement wherein (1) the polymerization in the upstream polymerization zone is carried out in a liquid medium under conditions for slurry polymerization, (2) the solid polymer-containing slurry discharged from the upstream polymerization zone is fed into a liquid medium exchanging zone through an upper feed opening (A) in its upper portion, said liquid medium exchanging zone being provided between the upstream polymerization zone and the downstream polymerization zone and connected to these zones by pipelines, and an additional supply of the liquid medium is fed into said exchanging zone through a lower feed opening (B) in the lower portion of said exchanging zone, (3) the discharge flow from an upper discharge opening (C) in the exchanging zone above the upper feed opening (A) is recycled to the upstream polymerization zone, and the discharge flow from a bottom discharge opening (D) in the exchanging zone below the lower feed opening (B) is fed into the downstream polymerization zone, and (4) the amount of the liquid medium in the discharge stream from the bottom discharge opening (D) is adjusted to 1 to 8 times the volume of the additional liquid medium fed from the lower feed opening (B), and thus the precipitated solid polymer is discharged from the bottom discharge opening (D) while it is concurrent with, and in contact with, the liquid medium from the lower feed opening (B).

The invention will be described in further detail below with the aid of the accompanying drawing in which FIG. 1 is a schematic flow chart illustrating an embodiment of the process of this invention.

DETAILED DESCRIPTION OF INVENTION

Figure 1:
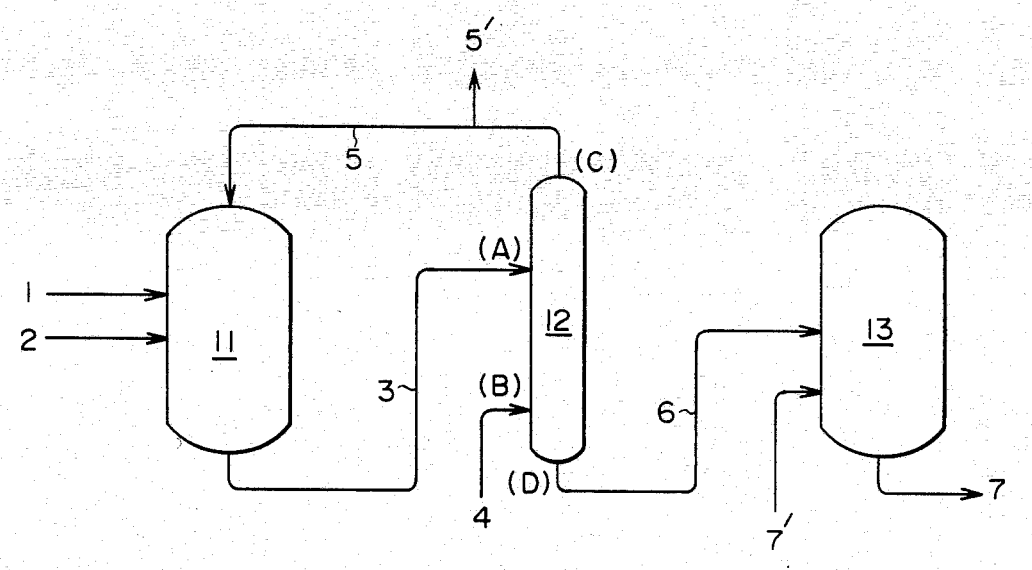

By performing the continuous multi-stage polymerization of olefins under the combination of parameters (1) to (4) in accordance with the process of this invention, a fully grown solid polymer in the solid polymer-containing slurry introduced from the upstream polymerization, zone can be preferentially precipitated toward the bottom of the liquid exchanging zone, and the liquid medium from the upstream polymerization zone containing factors which make it difficult to prescribe the desired polymerization conditions in the downstream polymerization zone, such as a fine powdery solid polymer in the slurry which has not fully grown, the catalyst which passes through the upstream polymerization zone within a short time, the molecular weight controlling agent, the liquid medium in the slurry, and the soluble polymer or the unreacted olefin dissolved in the medium, can be preferentially recycled to the upstream polymerization zone.

According to the process of this invention, therefore, it is possible to feed into the downstream polymerization zone a flow which is composed mainly of a fully grown solid polymer in the additional liquid medium freshly fed into the exchanging zone and in which the aforesaid factors are greatly reduced, i.e. a flow controlled to the desired composition different from the composition of the slurry from the upstream polymerization zone. As a result, the desired polymerization can be carried out in the downstream polymerization zone without being affected by the aforesaid factors including the olefin, the molecular weight controlling agent and the catalyst in the upstream polymerization zone. Hence, an olefin polymer having the desired uniform quality and the desired molecular weight distribution and/or composition distribution can be produced with good quality reproducibility without undesirable variations in these properties.

If, for example, while the parameters (1) to (3) are satisfied but the amount of the liquid medium in the discharge flow from the bottom discharge opening (D) of the exchanging zone as set forth in parameter (4) of the process of this invention is less than 1 times the volume of the additional liquid medium fed from the lower feed opening (B) of the exchanging zone, particularly such an amount that the solid polymer-containing slurry fed from the upstream polymerization zone contacts the additional liquid medium countercurrently (namely, if the amount of the additional liquid medium is large enough for the amount of the liquid medium in the discharge flow), the preferential precipitation of the fully grown solid polymer in the exchanging zone and the preferential recycling of the undesirable factors of the upstream polymerization zone which affect the polymerization conditions in the downstream polymerization zone to the upstream polymerization zone cannot substantially be achieved.

Various catalysts for olefin polymerization composed of a transition metal compound component and an organometallic compound component are known, and can be used in practicing the process of this invention.

Compounds of transition metals such as titanium, vanadium, chromium and zirconium are known as the transition metal compound component, and can be used in this invention. They are either liquid or solid under use conditions. Furthermore, these transition metal compounds may be single compounds, compounds mixed with or supported on other compounds, or complexes or double compounds with other compounds.

An example of a preferred transition metal compound catalyst component is a highly active transition metal catalyst component which can produce at least about 5,000, especially at least about 8,000 g, of an olefin polymer per millimole of the transition metal. A typical example is a highly active titanium compound catalyst component activated with a magnesium compound.

It may, for example, be a solid titanium compound catalyst component containing titanium, magnesium and halogen as essential ingredients which contains an amorphous magnesium halide and has a specific surface area of preferably at least about 40 m$^2$/g, especially preferably about 80 to about 800 m$^2$/g. This highly active titanium compound catalyst component may further include an electron donor such as organic acid esters, silicic acid esters, acid halides, acid anhydrides, ketones, acid amides, tertiary amines, inorganic acid esters, phosphoric acid esters, phosphorous acid esters and ethers.

An especially preferred species of the highly active titanium compound catalyst component is one which contains about 0.5 to about 15% by weight, especially about 1 to about 8% by weight, of titanium and in which the titanium/magnesium atomic ratio is from about $\frac{1}{2}$ to about 1/100, particularly from about $\frac{1}{2}$ to about 1/50, the halolgen/titanium atomic ratio is from about 4 to about 100, particularly from about 6 to about 80, and the electron donor/titanium mole ratio is from 0 to about 10, particularly from 0 to about 6.

Many transition metal compound catalyst components have been proposed and widely known, and in the practice of the process of this invention, they can be used by proper selection.

Various organometallic compounds as the other component of the catalyst are known, and can be used in this invention. Usually, organometallic compounds in which metals of Groups I to III of the periodic table are directly bonded to carbon are used. Examples include organic compounds of alkali metals, organic compounds of alkaline earth metals, and organoaluminum compounds. Specific examples include alkyllithiums, arylsodiums, alkylmagnesiums, alkylmagnesium halides, arylmagnesium halides, alkylmagnesium hydrides, trialkylaluminums, dialkylaluminum monohalides, alkylaluminums, sesquihalides, alkylaluminum dihalides, alkylaluminum hydrides, alkylaluminum alkoxides, alkylthium aluminums, and mixtures of these. Of these, the organoaluminum compounds are preferred.

In addition to the two catalyst components described above, the use of other components to control streospecificity, molecular weight, molecular weight distribution, etc. is known. Examples are electron donors such as organic acid esters, silicic acid esters, alkoxysilanes, carboxylic acid halides, carboxylic acid amides, tertiary amines, acid anhydrides, ethers, ketones and aldehydes. Halogenated hydrocarbons may also be used together. The electron donors may be used as a complex or adduct with the organometallic compound component, or a complex or adduct with other compounds such as a Lewis acid (e.g., an aluminum trihalide), prepared prior to the polymerization.

Examples of the olefin which can be used in the polymerization are ethylene, propylene, 1-butene, 1-pentene, 1-hexene, 1-octene, 1-decene, 4-methyl-1-pentene, 3-methyl-1pentene, styrene, butadiene, isoprene, 1,4-hexadiene, dicyclopentadiene, and 5-ethylidene-2-norbornene. Preferably, by the process of this invention, olefins having 2 to 8 carbon atoms are polymerized or copolymerized, or these olefines are copolymerized with dienes.

In the process of this invention, an olefin is polymerized continuously in the presence of the above-exemplified catalyst in a multiplicity of steps under the conditions meeting the parameters (1) to (4) above to produce an olefin polymer.

According to the parameter (1), the polymerization in the upstream polymerization zone is carried out in a liquid medium under conditions for slurry polymerization.

The olefin itself to be submitted to the polymerization may be used as the liquid medium under conditions which maintain it liquid. Or an inert hydrocarbon may also be used as the liquid medium. Such liquid media are known, and can be properly selected for use in this invention. Examples of the liquid medium are liquid olefins and inert hydrocarbons having 3 to 10 carbon atoms. Specific examples of the inert hydrocarbons are propane, butane, pentane, isopentane, hexane, heptane, octane, decane and kerosene. When the polymerization in the downstream polymerization zone is carried out in the vapor phase, the polymerization in the upstream zone is preferably carried out in a solvent selected from olefins having about 3 to 5 carbon atoms and inert hydrocarbons.

Hydrogen may be caused to be present in the polymerization zone in order to control the molecular weight of the polymer. In particular, when the same olefin as in the upstream polymerization zone is polymerized in the downstream polymerization zone, it is advantageous in view of the activity of the catalyst to prepare a polymer having a low molecular weight in the upstream zone by using a molecular weight controlling agent.

The polymerization temperature can be varied properly depending upon the type of the olefin to be polymerized. In the upstream polymerization zone, temperatures at which slurry polymerization is possible are employed. For example, the polymerization temperature is below the melting point of the olefin polymer, preferably at least 10° C. lower than the melting point and is within the range of from room temperature to about 130° C., particularly from about 40° C. to about 110° C. The polymerization pressure is, for example, atmospheric pressure to about 150 kg/cm², preferably about 2 to about 70 kg/cm².

The catalyst is used preferably in such proportions that per liter of the solvent, the amount of the transition metal compound catalyst component is about 0.0005 to about 1 millimole, particularly about 0.001 to about 0.5 millimole, as the transition metal atom, and the atomic ratio of the metal of the organometallic compound component to the transition metal is from about 1 to about 2,000, particularly from about 1 to about 500. Preferably, the electron donor component is used in an amount of 0 to about 1 mole, particularly from 0 to about 0.5 mole, per mole of the organometallic compound catalyst component.

The slurry polymerization is carried out substantially continuously. Specifically, the catalyst ingredients, the starting olefin, hydrogen and optionally an inert solvent are continuously fed into the upstream polymerization zone. These components are fed newly, and/or as a recycle flow from the liquid medium exchanging zone. The catalyst ingredients may be separately fed into the polymerization zone as solutions or suspensions in inert liquid media. Or prior to feeding into the upstream polymerization zone, they may be preliminarily contacted with each other in the presence or absence of a small amount of an olefin.

Various known devices can be cited for use as the upstream polymerization zone. The most typical one is a tank-type polymerization apparatus equipped with an agitator, which can be conveniently used in the present invention.

The concentration of the slurry in the upstream polymerization zone is preferably about 50 to about 700 g/liter.

According to parameter (2) of the process of this invention, the solid polymer-containing slurry in the aboveexemplified concentration discharged from the upstream polymerization zone is fed into an upper feed opening (A) provided in the upper portion of a liquid medium exchanging zone which is disposed between the upstream zone and a subsequent downstream polymerization zone and connected to these zones by pipelines. Furthermore, an additional supply of the liquid medium is fed into the exchanging zone from a lower feed opening (B) provided in its lower portion.

Furthermore, according to parameter (3), a discharge flow from an upper discharge opening (C) located above the upper feed opening (A) is recycled to the upstream polymerization zone, and a discharge flow from a bottom discharge opening (D) of the exchanging zone below the lower feed opening (B) is fed into the downstream polymerization zone.

At this time, according to parameter (4) of the process of this invention, the amount of the liquid medium in the discharge flow from the bottom discharge opening (D) is adjusted to 1 to 8 times, preferably 1.05 to 1.5 times, the volume of the additional liquid medium fed from the lower feed opening (B). It is possible therefore to control the process such that the solid polymer precipitated in the liquid medium exchanging zone is discharged from the bottom discharge opening (D) while it is concurrent with and in contact with, the additional liquid medium from the lower feed opening (B).

If the amount of the liquid medium in the discharge flow from the discharge opening (D) is less than 1 times, particularly less than 0.5 times, the volume of the additional liquid medium from the feed opening (B), the additional liquid medium from the feed opening (B) is contacted substantially countercurrently with the solid polymer-containing slurry fed from the feed opening (A) in the exchanging zone. Consequently, substantial mixing of the two occurs, and makes it impossible to circumvent the domination of the prescribing of the polymerization conditions in the downstream polymerization zone by the polymerization conditions in the upstream polymerization zone.

The process of this invention should therefore meet not only the parameters (1) to (3) but also the parameter (4). Preferably, the amounts of these liquids are nearly equal to each other. To avoid substantial mixing of the additional liquid medium and the solid polymer-containing slurry, an auxiliary means of adjusting the temperature of the additional liquid medium to a point at least about 20° C. lower than the temperature of the slurry may be employed in addition to the parameter (4). The temperature of the additional liquid medium is preferably about 0 to 40° C.

Thus, according to the process of this invention, while avoiding substantial mixing of the additional liquid medium and the solid polymer-containing slurry fed from the upstream polymerization zone, the liquid medium of the slurry is discharged from the upper discharge opening (C) and recycled to the upstream polymerization zone. For this reason, it is easy to prescribe the desired polymerization conditions in the downstream polymerization zone.

The additional liquid medium to be fed into the liquid medium exchanging zone from its lower feed opening (B) zone may, for example, be a liquid olefin or an inert hydrocarbon preferably having 3 to 10 carbon atoms as already exemplified with regard to the liquid medium in the upstream polymerization zone. Preferably, the olefin or liquid medium (or diluent) used in the downstream polymerization zone is selected as the additional liquid medium. Preferably, the amount of the liquid medium fed is adjusted to 0.2 to 10 times, particularly 0.5 to 5 times, the volume of the liquid discharged into the liquid medium exchanging zone from the upstream polymerization zone. An olefin gasified by the heat of polymerization in the upstream polymerization zone may be used as such a liquid medium after liquefying it by cooling.

According to the process of this invention, the amount of the liquid medium in the discharge flow from the bottom discharge opening (D) of the liquid medium exchanging zone is adjusted to 1 to 8 times, preferably 1.05 to 1.5 times, the volume of the additional liquid medium fed from the lower feed opening (B) of the exchanging zone, whereby the precipitated solid polymer is discharged from the discharge opening (D) while it is concurrent with, and in contact with, the liquid medium from the lower feed opening (B). When the polymerization in the downstream polymerization zone is carried out in the gaseous phase, the heat of polymerization can be removed by the gasification of the discharge liquid. Hence, the amount of the discharge liquid can also be carried out for this purpose.

The process of this invention markedly reduces the likelihood that in the liquid medium exchanging zone, the solid polymer-containing slurry from the upstream polymerization zone countercurrently contacts, and is mixed with, the additional liquid medium fed into the exchanging zone from the lower feed opening (B). It is possible therefore to prevent the polymer fed to the downstream polymerization zone from the exchanging zone from carrying excessive amounts of those components present in the upstream polymerization zone which are not necessary for the downstream polymerization zone. Hence, the polymerization conditions in the downstream polymerization zone can be prescribed without being affected by the polymerization conditions in the upstream polymerization zone.

The polymerization in the downstream zone can be carried out either in slurry or in the vapor phase. In particular, the vapor phase polymerization brings about such advantages as improved flowability and prevention of blocking of the gas discharge system because according to the process of this invention, the fine powdery polymer is discharged from the liquid medium exchanging zone and no substantial amount of it is conducted to the downstream polymerization zone. Furthermore, the heat of polymerization in the downstream polymerization zone can be controlled easily by adjusting the amount of the discharge liquid from the liquid medium exchanging zone which is to be fed into the downstream zone. In performing the vapor phase polymerization in the downstream zone, the polymer slurry from the liquid medium exchanging zone is directly fed into the downstream zone and the polymerization is carried out after gasifying the liquid medium. Of course, a part or the whole of the liquid medium may be gasified prior to introduction into the downstream polymerization zone, or the liquid medium may be concentrated in advance.

In addition to the desired olefin, the catalyst ingredients may be freshly supplied to the downstream polymerization zone. But since the solid polymer formed in the upstream polymerization zone contains the catalyst, sufficient polymerization activity is observed without adding a fresh supply of the catalyst ingredients. When the polymerization in the downstream zone is to be carried out in slurry, the same conditions as described above with regard to the polymerization in the upstream zone can be employed.

Furthermore, when the polymerization in the downstream zone is to be carried out in the vapor phase, the same polymerization conditions as in the slurry polymerization can be employed except that known vapor-phase polymerization devices such as a fluidized bed reactor, an agitated and fluidized bed reactor and an agitated reactor are used.

In the downstream polymerization zone, there can be produced a polymer having a different molecular weight or composition from the polymer produced in the upstream zone. An additional polymerization zone may be provided upstream of the upstream polymerization zone or downstream of the downstream polymerization zone.

In one preferred embodiment of the present invention, a crystalline polymer or copolymer of propylene or ethylene is produced in the upstream polymerization zone by slurry polymerization, and a polymer or copolymer of propylene or ethylene having a different molecular weight or composition is produced in the downstream polymerization zone by vaporphase polymerization. In this case, a step of polymerizing or copolymerizing propylene or ethylene in the vapor phase may be provided downstream of the downstream polymerization zone.

Thus, the process of this invention can give a polymer or copolymer having the desired properties.

FIG. 1 attached to this application shows a flow chart of one embodiment of the process of this invention. The upstream polymerization zone 11 is charged continuously with a catalyst composed of a transition metal compound component and an organometallic compound component from a pipeline 1 and an olefin from a pipeline 2. The individual ingredients of the catalyst may be separately fed by providing separate pipelines. Or separate pipelines may be provided for feeding a molecular weight controlling agent, a liquid medium, etc. In the embodiment shown in the drawing, a liquid olefin is used as the liquid medium.

The solid polymer-containing slurry which is a suspension of the olefin polymer produced in the upstream zone 11 in the liquid olefin is discharged from the bottom of the upstream zone, and fed through a pipeline 3 into an upper feed opening (A) provided at the upper portion of a liquid medium exchanging zone 12 connected to the upstream zone 11 and the downstream polymerization zone 13 through pipelines 3 and 6. In the meantime, an additional supply of the liquid medium is fed through pipeline 4 into the exchanging zone 12 from a lower feed opening (B) provided in the lower portion of the exchanging zone 12.

The discharge flow from the discharge opening (C) above the feed opening (A) is recycled to the upstream polymerization zone 11 through a pipeline 5, and a discharge flow from a bottom discharge opening (D) located below the lower feed opening (B) is fed into the downstream polymerization zone 13 through the pipeline 6. As required, the desired olefin may be fed into the downstream zone 13 through a pipeline 7'. Furthermore, as required, the catalyst, the molecular weight controlling agent, etc. may further be supplied. In the meantime, the resulting polymer is withdrawn from the bottom of the downstream zone 13 through a pipeline 7.

When the liquid medium exchanging zone is designed in a tower type, the positions of the lower feed opening (B) and the upper feed opening can be properly selected. Preferably, it is so designed that the inside diameter R of the tower has the following relation to the distance (height) $h_1$ from the upper feed opening (A) and the upper discharge opening (C), the distance (height) $h_2$ from the lower feed opening (B) to the upper feed opening (A) and the distance (height) $h_3$ from the bottom discharge (D) to the lower feed opening (B).

$h_1:R = 0.8-5.0:1$ $h_2:R = 0.8-8:1$ $h_3:R = 0.8-5:1$

A part of the recycle flow from the upper discharge opening (C) may, if required, be removed out of the system through a line 5'. The residence time of the solid polymercontaining slurry in the liquid medium exchanging zone is preferably about 10 to about 300 seconds, especially preferably about 30 to about 120 seconds.

The following examples illustrate the present invention more specifically.

EXAMPLE 1

A polymerization apparatus of the type shown in FIG. 1 was used.

A first polymerization vessel (upstream zone) 11 having a capacity of 130 liters was charged with 0.5 mmole/hr, as titanium atom, of a titanium catalyst component composed of titanium tetrachloride and diisobutyl phthalate supported on magnesium chloride, 25 mmoles/hr of triethyl aluminum and 5 mmoles/hr of ethyl silicate from a pipeline 1 and 30 kg/hr of propylene and hydrogen (3.5 mole % based on the gaseous phase) from a pipeline 2, and propylene was polymerized continuously in slurry at 70° C. and 30 kg/cm$^2$ with an average residence time of 1 hours. The polymer slurry withdrawn from a pipeline 3 consisted of 25 kg/hr of polypropylene and 40 kg/hr of propylene. The polymer slurry was fed into an exchanging tower 12 (inside diameter 120 mm; the total height from (C) to (D) 1050 mm) through a feed opening (A) provided at a height of 800 mm ((A)–(D)). In the meantime, liquid propylene as an additional liquid medium maintained at 40° C. was introduced at a rate of 35 kg/hr into the exchanging tower 12 through a feed opening (B) provided at a height of 200 mm ((B)–(D)).

Through an upper discharge opening (C) at the top of the exchanging tower 12, a discharge flow was recycled to the first polymerization vessel 11 at a rate of 35 kg/hr as propylene through a pipeline 5. The recycle flow contained a small amount of fine powdery polypropylene. Meanwhile, a polymer slurry composed of 40 kg/hr of propylene and 25 kg/hr of polypropylene was discharged from a bottom discharge opening (D) at the bottom of the exchanging tower through a pipeline 6. The amount of the liquid medium in the discharge flow from the discharge opening (D) was 1.14 times the volume of the additional liquid medium fed from the feed opening (B). The average residence time of the polymer particles in the exchanging tower 12 was about 90 seconds. The resulting polypropylene had a melt index of 45 g/10 min., and contained 98.5% by weight of a n-heptane-insoluble portion and less than 0.7% by weight of a fine powder having a particle diameter of less than 200 microns. The polymer slurry was subsequently introduced into a second polymerization vessel (downstream polymerization zone) 13 where propylene was polymerized in the vapor phase at 80° C. and 17 kg/cm$^2$ with an average residence time of 1.5 hours. Polypropylene having a melt index of 4.5 g/10 min. and a weight average molecular weight/number average molecular weight ratio of 8.0 was obtained at a rate of 42.5 kg per hour. The proportion of polypropylene having a particle diameter of less than 200 microns was only 0.7% by weight.

COMPARATIVE EXAMPLE 1

Example 1 was repeated except that the slurry was not recycled to the first polymerization vessel from the exchanging zone. Polypropylene having a melt index of 5.5 g/10 min. and a weight average molecular weight/number average molecular weight ratio of 7.2 was obtained at a rate of 45 kg per hour. The proportion of a fine powdery polymer having a particle diameter of less than 200 microns was 21% by weight.

What is claimed is:

1. In a process for producing an olefin polymer which comprises continuously polymerizing an olefin in the presence of a catalyst composed of a transition metal compound component and a organometallic compound component in at least two independent polymerization zones connected in series by a pipeline while feeding the olefin and the catalyst into an upstream zone of polymerization and withdrawing the resulting polymer from a downstream zone of polymerization; the improvement wherein
    (1) the polymerization in the upstream polymerization zone is carried out in a liquid medium selected from the group consisting of liquid olefins and inert hydrocarbons having 3 to 10 carbon atoms under conditions for slurry polymerization,
    (2) a solid polymer-containing slurry is discharged from the upstream polymerization zone and is fed into a liquid medium exchanging zone through an upper feed opening (A) in the upper portion thereof, said liquid medium exchanging zone being provided between the upstream polymerization zone and the downstream polymerization zone and connected to these zones by pipelines, and an additional supply of liquid medium selected from the group consisting of liquid olefins and inert hydrocarbons having 3 to 10 carbons atoms is fed into said exchanging zone through a lower feed opening (B) in the lower portion of said exchanging zone,
    (3) a discharge flow from an upper discharge opening (C) in the exchanging zone above the upper feed opening (A) is recycled to the upstream polymerization zone, and a discharge flow from a bottom discharge opening (D) in the exchanging zone below the lower feed opening (B) is fed into the downstream polymerization zone, and
    (4) the amount of the liquid medium in the discharge flow from the bottom discharge opening (D) is adjusted to 1 to 1.5 times the volume of the additional liquid medium fed from the lower feed opening (B), and thus a precipitated solid polymer is discharged from the bottom discharge opening (D) while the same is concurrent with, and in contact with, the liquid medium from the lower feed opening (B).

2. The process of claim 1 wherein the amount of the liquid medium in the discharge flow from the bottom discharge opening (D) is adjusted to 1.05 to 1.5 times the volume of the additional liquid medium fed from the lower feed opening (B).

3. The process of claim 1 wherein the polymerization in the downstream polymerization zone is carried out in the vapor phase.

4. The process of claim 1 wherein the temperature of the additional liquid medium is at least about 20° C. lower than the temperature of the solid polymer-containing slurry.

5. The process of claim 1 wherein the temperature of the additional liquid medium is in the range of from about 0° to 40° C.

6. The process of claim 1 wherein the liquid medium exchanging zone is a tower having an inside diameter R and wherein the ratios of the height $h_1$ from the upper feed opening (A) to the upper discharge opening (C), the height $h_2$ from the lower feed opening (B) to the upper feed opening (A) and the height $h_3$ from the bottom discharge opening (D) to the lower feed opening (B) are as follows:

$h_1:R = 0.8-5.0:1$ $h_2:R = 0.8-8:1$ $h_3:R = 0.8-5:1.$

7. The process of claim 1 wherein the liquid medium in each of the upstream and downstream polymerization zones is a liquid olefin.

8. The process of claim 1 wherein the liquid medium in each of the upstream and downstream polymerization zones is an inert hydrocarbon having 3 to 10 carbon atoms.

9. The process of claim 1 for homopolymerizing or copolymerizing olefins having 2 to 8 carbon atoms or copolymerizing said olefins with a diene.

* * * * *